A. WIBERG.
ADDING MACHINE.
APPLICATION FILED FEB. 9, 1909.

1,007,508. Patented Oct. 31, 1911.
7 SHEETS—SHEET 2.

A. WIBERG.
ADDING MACHINE.
APPLICATION FILED FEB. 9, 1909.

1,007,508.

Patented Oct. 31, 1911.
7 SHEETS—SHEET 3.

WITNESSES

INVENTOR
Allan Wiberg
BY
Howson and Howson
his ATTORNEYS

A. WIBERG.
ADDING MACHINE.
APPLICATION FILED FEB. 9, 1909.
1,007,508.
Patented Oct. 31, 1911.
7 SHEETS—SHEET 4.
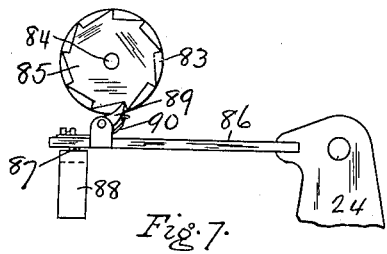
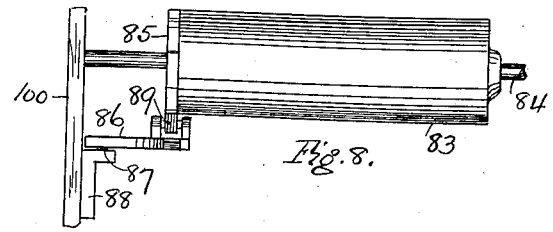
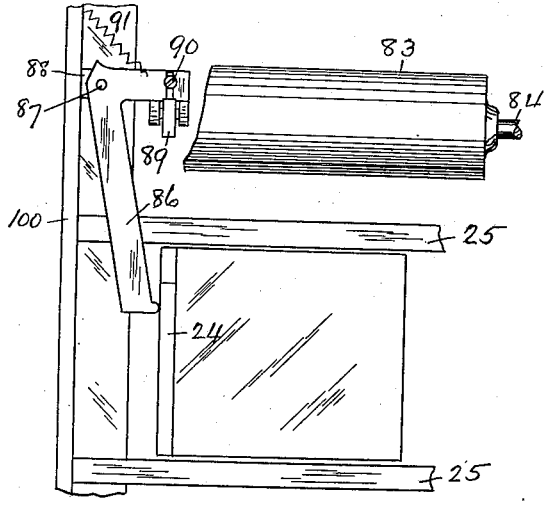
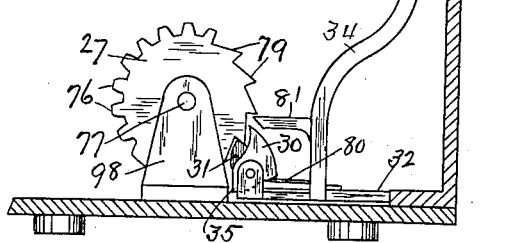
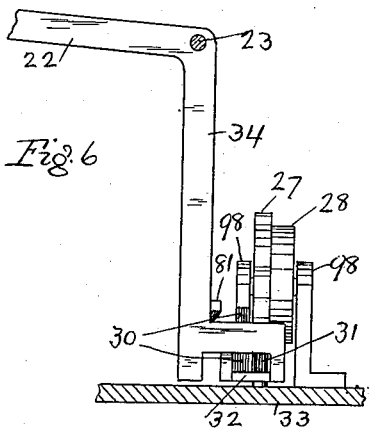
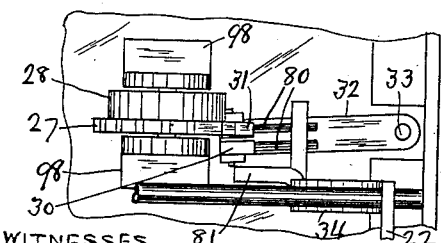
WITNESSES
L. H. Grote
M. E. Keir
INVENTOR
Allan Wiberg
BY
Howson and Howson
his ATTORNEYS

A. WIBERG.
ADDING MACHINE.
APPLICATION FILED FEB. 9, 1909.

1,007,508.

Patented Oct. 31, 1911.

7 SHEETS—SHEET 5.

WITNESSES
L. H. Grote
William Abbt

INVENTOR
Allan Wiberg
BY
Howson and Howson
his ATTORNEYS

A. WIBERG.
ADDING MACHINE.
APPLICATION FILED FEB. 9, 1909.
1,007,508.
Patented Oct. 31, 1911.
7 SHEETS—SHEET 7.
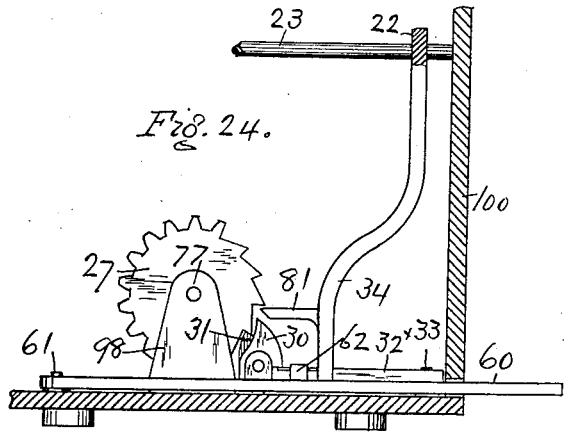
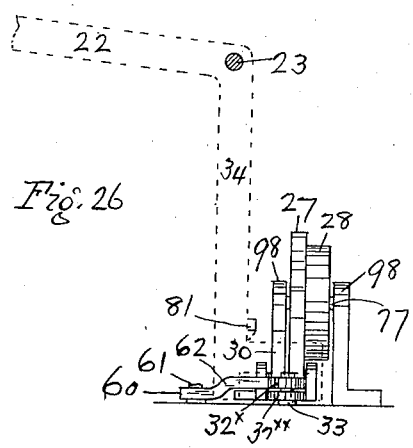
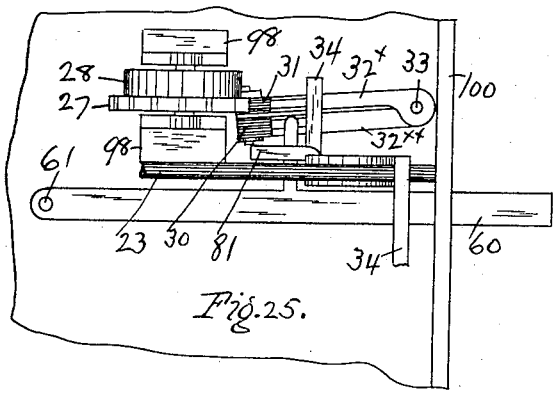
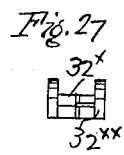
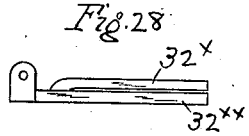
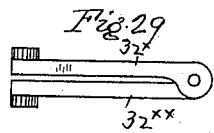
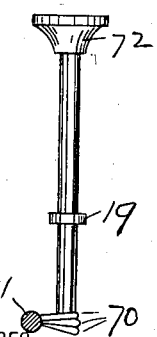
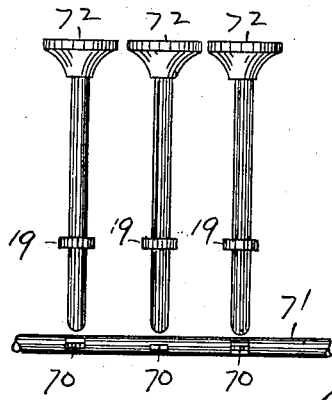
WITNESSES:
L. H. Grote
M. E. Keis
INVENTOR
Allan Wiberg
BY
Howson and Howson
his ATTORNEYS

UNITED STATES PATENT OFFICE.

ALLAN WIBERG, OF STOCKSUND, SWEDEN.

ADDING-MACHINE.

1,007,508.  Specification of Letters Patent.  Patented Oct. 31, 1911.

Application filed February 9, 1909. Serial No. 476,884.

*To all whom it may concern:*

Be it known that I, ALLAN WIBERG, a subject of the King of Sweden, and resident of Stocksund, Sweden, have invented new and useful Improvements in Adding-Machines, of which the following is a specification.

This invention relates to an improved adding machine.

On the accompanying drawing there is shown diagrammatically, as an example only, a machine which simultaneously with the adding operation also prints the several addenda as well as the total obtained.

Figure 1:
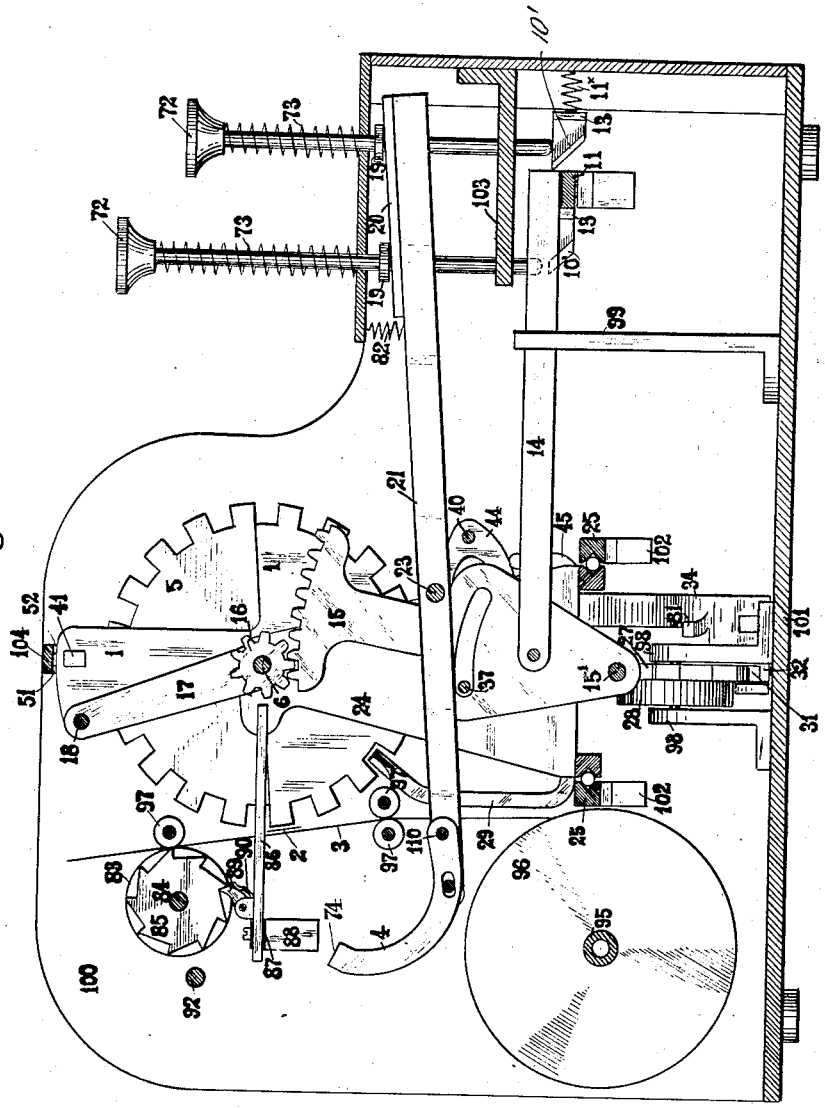
Figure 2:
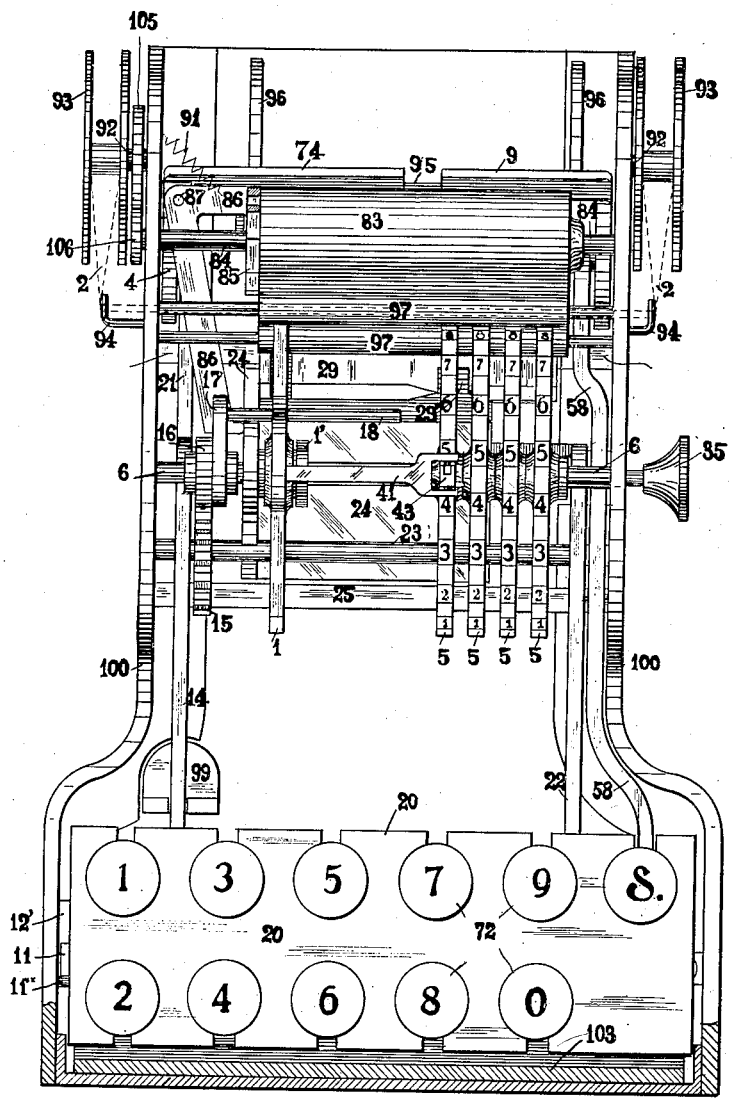
Figure 3:
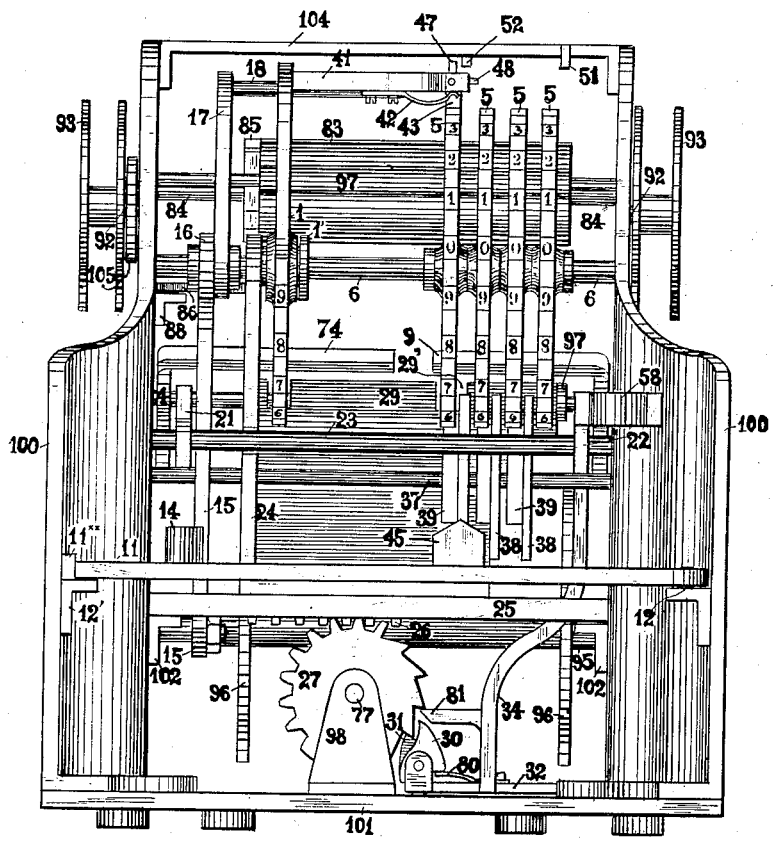
Figure 10:
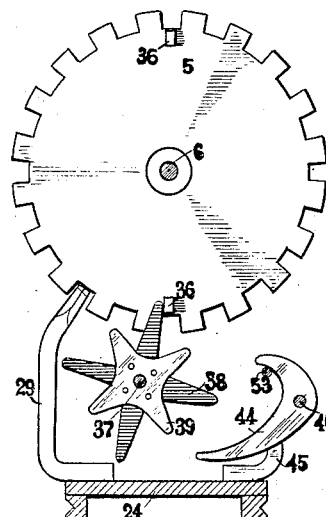
Figure 11:
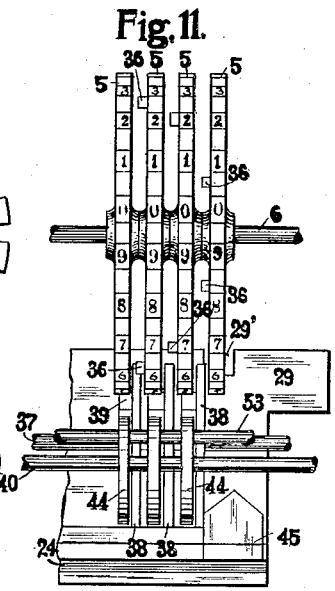
Figure 12:
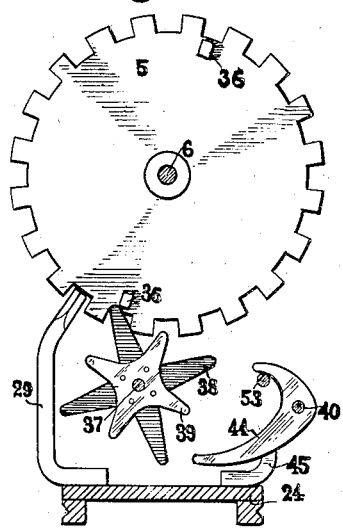
Figure 13:
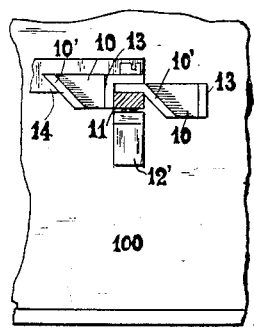
Figure 14:
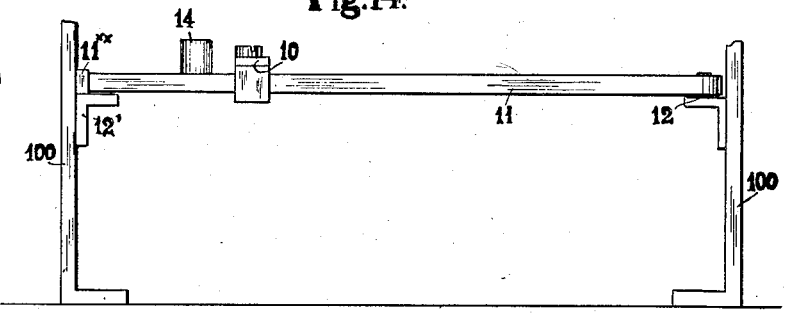
Figure 15:
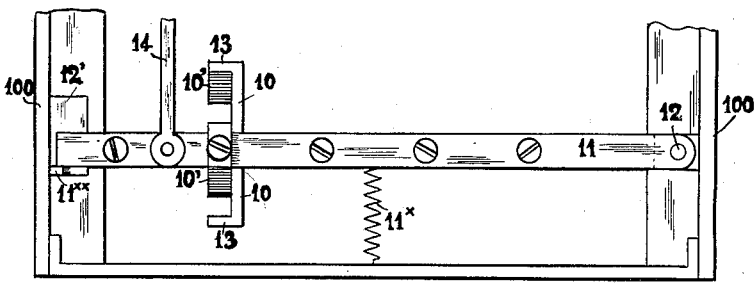
Figure 16:
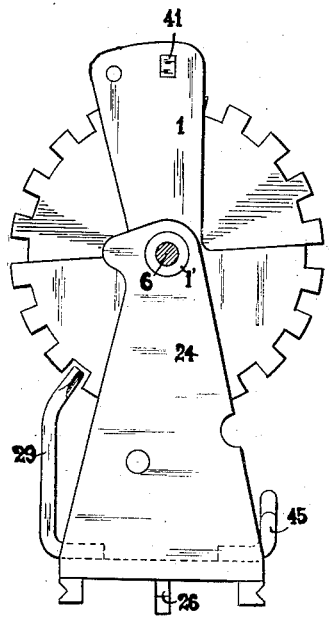
Figure 17:
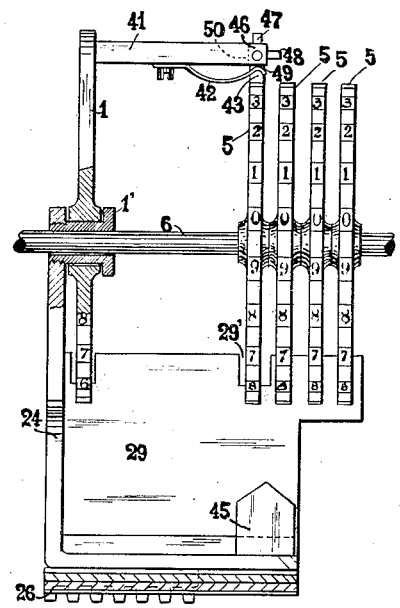
Figure 18:
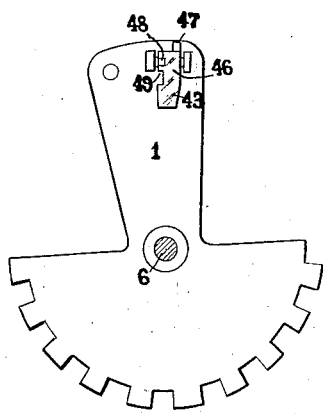
Figure 22:
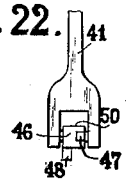
Figure 19:
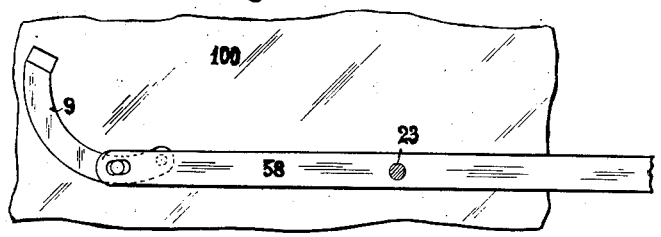
Figure 21:
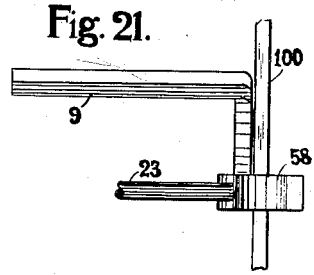
Figure 20:
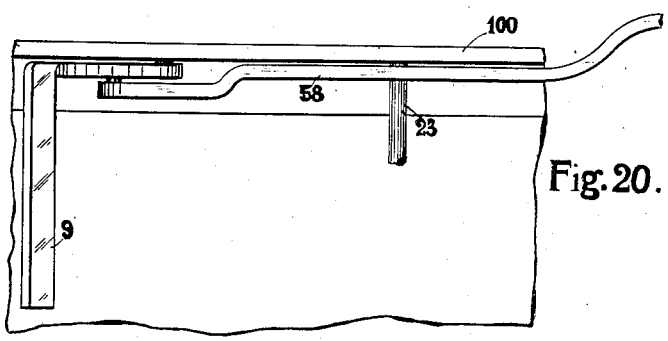
Figure 23:
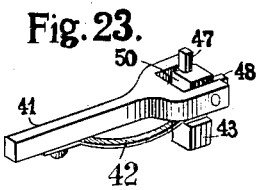

Figure 1 represents the machine in a side-view, Fig. 2 the same in plan and Fig. 3 in a front view, certain parts being, however, removed for the sake of clearness. Figs. 4, 5 and 6 are, respectively, end, plan and side views of the mechanism for bringing the tooth 43 into engagement with each adding wheel successively; Figs. 7, 8 and 9 are respectively end, side and plan views of the paper and ribbon feed device; Figs. 10 and 11 are side and front elevations of so much of the mechanism as is necessary to illustrate the operation of the transmitting wheels 38, 39; Fig. 12 is a view similar to Fig. 10 but with the mechanism in a different position; Figs. 13, 14 and 15 are respectively end, plan and side views of the lever system actuated by the keys; Figs. 16 and 17 are respectively end and front elevations of the carriage 24; Fig. 18 is a side elevation of the wheel 1; Figs. 19, 20 and 21 are respectively end, plan and side elevations of the hammer 9 and its operating connections; Figs. 22 and 23 are respectively plan and perspective views of the arm 41; Figs. 24, 25 and 26 are respectively end, plan and side views of the carriage releasing mechanism; Figs. 27, 28 and 29 are respectively end, side and plan views of the arms 32ˣ and 32ˣˣ; Figs. 30 and 31 are side and front views of a modified means for operating the shaft 71.

The arrangement and operation of the machine are as follows.

The addenda are recorded line after line by means of keys to be depressed and by the aid of an intermediate device to be described farther on rotates a wheel 1 provided on half of its periphery with ten slots and ten teeth the latter provided with printing types representing the numerals 0 to 9. The wheel 1 is loosely mounted on a pivot 1′ fixed to a carriage 24, said pivot being bored through surrounds a shaft 6 fixed in the frame of the apparatus. On this shaft the adding wheels 5 are loosely mounted but are prevented from moving along the shaft in a known manner. These wheels 5 have a diameter equal to that of the wheel 1 but the double number *i. e.* twenty slots and twenty teeth all around the periphery having two series of the numerals 0 to 9. Behind the tooth that in the normal position of the wheel 1 carries the cipher 0 there is arranged an ink ribbon 2 extending past the adding wheels 5, and behind the ink ribbon there is an endless paper band 3 and behind the latter a hammer 74 for the wheel 1 and a hammer 9 for the wheels 5, which at the beginning have their ciphers 0 facing the ink ribbon 2. The ink ribbon and paper band and the hammers are operated by devices to be described later on.

The addenda are put down or recorded in the machine by depressing the corresponding keys beginning with the numeral farthest to the left of the line of numerals to be recorded. At each depression of a key the wheel 1 is rotated so far as to cause the tooth carrying the desired numeral to stop in front of the ink ribbon 2 after which the paper 3 is pressed against the tooth by the hammer 74 the numeral being thereby printed. Simultaneously with the wheel 1 one of the wheels 5 (the nearest one at first) is also rotated by means of a coupling device on the wheel 1 to be described later on so that the same numeral on the latter wheel is arrested in front of the ink ribbon 2 but is not printed. After the key has rotated the wheel 1 its coupling with the nearest wheel 5 is broken off and the wheel 1 returns to the zero position under the action of a spring, not shown, whereupon the carriage 24 with wheel 1 is moved a step toward the wheels 5 and the wheel 1 is automatically coupled with the next of the wheels 5. The same series of operations as before is now repeated: the key showing the next numeral in the line of the addendum is depressed, by which the wheel 1 is turned and presents the corresponding numeral to be printed by the hammer 74 on the paper 3 beside the preceding numeral and at the same time the same numeral is brought forward on the second wheel of the wheels 5. After the whole of the addendum has been recorded its numerals on the one hand are printed beside each other on the paper 3 and on the other hand appear on the wheels 5 in front of the ink ribbon 2. After this is done the carriage 24 and the wheel 1 is moved back to the initial position by means of a device to be described later on and simultaneously the paper is fed one step. After this the second line of the addenda is recorded by means of the wheel 1 and the hammer 74 and the wheel 1 has carried with it the wheels 5 successively so that when the second addendum has been recorded in the machine it is printed on the paper band 3 under the first addendum and on the wheel 5 the total of both addenda is found in front of the ink ribbon. The wheel 1 is returned to the initial position and the paper is fed one step after which a third addendum is recorded. In this manner one continues to record as many addenda as desired and after having recorded the last one the hammer 9 is caused to strike the paper and ink ribbon against the wheels 5 by depressing a particular key or the like by which the total is printed on the paper. For effecting the movements just described the machine is provided with the following devices. The keys 72 marked with the numerals 0 to 9 are vertically movable in the usual manner in the frame of the machine and are returned to the initial position by means of springs 73. In the form of machine shown the keys are arranged in two rows on each side of an arm 11 pivoted at 12 the free end of said arm being supported by a bracket 12' on the frame so as to move in one and the same horizontal plane. The arm 11 is normally held by a spring 11$^x$ against a fixed stop 11$^{xx}$ and is provided with traverses 10 each carrying an incline 10' and a stop-plate 13. The arm 11 is connected by a rod 14 with a toothed segment 15 pivoted at 15' and meshing with a toothed wheel 16. Said toothed wheel 16 is loosely mounted on the shaft 6 but cannot slide along it and is rigidly connected with an arm 17. This arm 17 carries a horizontal rod 18 passing through a hole in the wheel 1. By this arrangement the wheel 1 will rotate the same angle as the toothed wheel 16. By adapting the inclines 10' on the traverses 10 respectively relatively to the spindles of the keys 72 it may be effected that each key at its depression rotates the wheel 1 so far as to move the corresponding numeral to printing position, and the stop-plates 13 on the traverses 10 are adjusted so as to prevent the arm 11 and consequently also the wheel 1 from rotating too far by abutting against the key spindles respectively. The key spindles also are provided with fixed collars 19 acting on a plate 20 fixed to and supported by two arms or levers 21 and 22 loosely mounted on a horizontal shaft 23. The arm 21 extends on the other side of the shaft 23 and is connected by its free end with the short arm of a bell crank lever 4 mounted loosely on a pivot 110 fixed in the frame 100 of the machine, the long arm of said bell crank lever being formed as a hammer 74 which, at the depression of a key 72 and thereby of the plate 20, strikes the paper 3 and the ink ribbon 2 against the tooth of the wheel 1 which, upon the depression of the key, has been moved to the printing position. On releasing afterward the key it ascends and the plate 20 follows under the action of the springs 82, the arm 21 and thereby the hammer 74 returning to their initial positions. The arm 22 also extends on the other side of the shaft 23 forming a downward projecting curved arm 34 having a forked end the object of which will be described later on.

The pivot 1' on which the wheel 1 rotates is affixed as mentioned to a carriage 24 represented in Figs. 16 and 17 in an end and front view respectively. The carriage 24 in order to be easily movable is shown to be supported by balls in guides 25, 25. Said carriage 24 is provided with a rack 26, into which gears a toothed wheel 27 rotating on a horizontal shaft 77. The toothed wheel 27 is rigidly connected with a box 28 containing a spring that tends to rotate the wheel 27 in such a direction as to move the carriage 24 with the wheel 1 toward the adding wheels 5. The wheel 1 carries a fixed arm 41 (Figs. 1, 2, 3, 16, 17, 22 and 23) carrying a tooth 43 at its forked end. The length of the arm 41 is such as to hold its tooth 43 in a slot between two teeth in the adding wheel 5 located farthest to the left when the carriage 24 and consequently the wheel 1 occupies its position farthest to the left. Said adding wheel 5 is rotated by the tooth 43 when the wheel 1 is rotated and consequently it is rotated the same angle as the wheel 1. To the carriage 24 a plate 29 (Figs. 16, 17 and 10-12) is attached and said plate engages a slot between two teeth of the wheels 5 for holding them. The plate 29, however, has a slot or recess 29' directly opposite the wheel engaged by the tooth 43 for permitting the rotation of said wheel by said tooth.

To hold the carriage 24 during the addition and to move it so as to cause the tooth 43 to engage each adding wheel successively serves the device represented in Figs. 4 to 6 seen from the end, from above and from the side. The wheel 27 is on part of its periphery provided with the number of teeth 78 required for moving the carriage 24 and on another part of its periphery is provided with catch teeth 79 (see Fig. 4). An arm 32 movable horizontally on a pivot 33' passing through the hole 33 and attached to the base plate of the frame (see Fig. 3) carries two catches 30 and 31, each provided with a shoulder 35 and kept in the position shown in Fig. 4 by a spring 80. The catch 30 being mounted on the same shaft as the catch 31 is of a greater length than the latter and lies normally laterally of the wheel 27, see Figs. 5 and 6. The forked end of the arm 34 mentioned above engages the arm 32, see Figs. 4 to 6, and when the plate 20 is depressed at the downward movement of one of the keys 72 the arm 34 is moved to the right of Fig. 6. The fork is shaped so as not to engage the arm 32 at the beginning of this movement but at the end of the movement it takes the arm 32 along with it and the catch 31 is moved out of engagement with the tooth 79 resting against it, the catch 30 being simultaneously moved to the right and into a slot between two of the teeth 79 (see Figs. 4 and 6). When the catch 31 has come outside the wheel 27 the latter is rotated by the action of the spring in the spring box or barrel 28 until stopped by the catch 30 thus having rotated half the distance between two teeth 79. By this rotation of the wheel 27 the carriage 24 has been moved so far that the left edge of the plate 29 at the recess 29' has entered the slot in the adding wheel in question and fixed it and that the tooth 43 has reached the free space between two of the adding wheels 5. On releasing the key the plate 20 actuated by springs 82 follows, thereby rotating the arm 34 backward and the forked end of the arm 34 is moved from the right to the left in Fig. 6. In consequence of the large opening of the fork some time is required before it engages the arm 32 and during this time the arm 11, released by the rising key, has been returned by its spring 11$^x$ to the normal position, thereby rotating the wheel 1 to the zero position and with it the arm 41 and tooth 43. By the time this has occurred the fork of the arm 34 engages the arm 32 and moves it back to the position shown in Fig. 5 the catch 30 being then out of engagement with the wheel 27 and the catch 31 facing it but occupying the next slot between the teeth 79. The wheel 27 is thereby rotated another half-tooth and the carriage 24 and with it the tooth 43 is moved into engagement with next adding wheel and the recess 29' lies in front of said wheel. Thereupon a key with the next numeral in the addendum is depressed and the series of operations is repeated and so on to the last numeral in the addendum.

Each adding wheel 5 is provided in the vicinity of the periphery on the side facing a wheel of higher value with two projections 36 arranged diametrically to each other and in the path of said projections lies one arm of a wheel 38 having four radial arms of equal length mounted on a fixed shaft 37 located outside the adding wheels 5. Said wheel 38 is capable of rotating but not sliding on the shaft 37 (Figs. 10 to 12). The wheel 38 is rigidly connected with another wheel 39 having an equal number of shorter arms lying in the same plane as the adding wheel of higher value just mentioned. The wheels 38 and 39 have their arms displaced relatively to each other as shown. This double wheel, the transmitting wheel, has thus a starlike appearance, as shown in Figs. 10 and 12. In the vertical plane of each of the wheels 39 an arm 44 is mounted on a fixed shaft 40 parallel to the shaft 37, and said arms 44 are operated or lifted on the reciprocating movement of the carriage 24 by a roof-shaped lug 45 attached to the carriage. When the transmitting wheel occupies its normal position, shown in Fig. 10, the arm 44 can be lifted by the lug 45 without operating the wheel 39.

The operation of the transmitting device is as follows. When one of the two projections 36 of one of the wheels 5 has reached one of the arms of the wheel 38, as in Fig. 10, the tooth carrying the type 9 on said wheel 5 is located just opposite the ink ribbon 2, and when this wheel 5 is, for the purpose of adding, rotated one or more teeth the projection 36 pushes said arm and rotates the wheel 38 to the position shown in Fig 12. The wheel 39 partaking in the rotation of wheel 38 one of its arms enters a slot in the adjacent wheel 5 of a higher value not being able, however, to rotate it as said wheel is held by the plate 29. Upon the movement of the carriage 24 on to the next adding wheel 5 the lug 45 elevates the arm 44 in front of the next transmitting wheel without being able to rotate it, said transmitting wheel occupying always, during the addition, the position shown in Fig. 10. The last adding wheel 5 having been acted upon and the operator having released the key 72 the toothed wheel 27 advances the carriage 24 one step as usual. This movement is utilized for moving the tooth 43 of the arm 41 out of the way to permit the return of the carriage 24 to its initial position without interference between the tooth 43 and the wheels 5. For this purpose the tooth 43 is pivoted on a horizontal shaft in the forked arm 41 and the hub 46 of the tooth 43 is provided on the one hand with two projections 47, 48 lying in different planes at right angles or thereabout to each other and on the other hand with two surfaces 49, 50 for the spring 42 lying at right angles or thereabout to each other. In the frame of the machine there are further two fixed stops 51, 52 (Fig. 1) having such a position that the projection 47 strikes the stop 51 when the tooth 43 leaves the last adding wheel, the tooth 43 being thereby turned so far out of the way that the spring 42 will press against the surface 50 on the hub 46. The other stop 52 has such a position that the projection 48 now turned upward strikes it when the carriage 24 in returning approaches its initial position, the tooth 43 being thereby turned back to its operating position; the spring 42 is then pressing against the surface 49 on the hub 46. The carriage 24 is returned with the hand by pushing the knob 35 (Fig. 2) toward the left, said knob being attached to a rod connected to the carriage 24. When at the returning of the carriage 24 the roof-shaped lug 45 again successively raises the arms 44 the latter do not operate the transmitting wheels occupying the position shown in Fig. 10 but on the transmitting wheels occupying the position shown in Fig. 12 they seize the arm of the wheel 39 lying in their path turning it upward, so that the transmission wheel occupies again the position shown in Fig. 10. The adding wheel in question thereby has been rotated one tooth. 53 is a stationary rod preventing the arms 44 from moving too far. All the addenda having thus been transmitted to the machine the key marked S in the Fig. 2 is depressed thereby turning the lever 58 and causing the hammer 9 to strike against the wheels 5 and print the total. The combination between the lever 58 and the hammer 9 is like the combination between the lever 21 and the hammer 74.

The devices for feeding the paper and ink ribbon are shown in the Figs. 1 to 3 and 7 to 9. The paper 3 on which the figures are printed is wound on a roll 96 (Fig. 1) and passes from said roll between the guide rollers 97 and the feeding roller 83 all mounted in the sides of the frame. On the one end of the roller 83 (Figs. 1 and 8) is fixed a toothed wheel 85 in which engages a pawl 89 acted upon by a spring 90 and pivoted at the one arm of the bell crank lever 86 (Figs. 1, 2, 7, 8 and 9) mounted on the pipe 87. Each time the carriage 24, after an addendum has been printed, is returned to its position farthest to the left it strikes the other arm of the bell crank lever 86, which is held by a spring 91 in the path of the carriage 24 and which is hereby rotated, said movement being transferred by the pawl 89 to the toothed wheel 85 and the roller 83 the latter thereby feeding the paper. At the subsequent movement of the carriage toward the right the lever 86 returns under the action of the spring 91 to its former position, its movement being limited by the shoulder 88 abutting against the side 100 of the frame. The movement thus imparted to the roller 83 is also utilized for feeding the ink ribbon 2 which passes from the right hand roller 93 (Figs. 2 and 3) over the pins 94 past the cipher wheels to the left hand roller. The latter is mounted on a stud 92 and connected to a toothed wheel 105, that gears with the toothed wheel 106. Said wheel 106 is keyed to the shaft 84 of the roller 83 and consequently will be rotated simultaneously with the roller 83. The movement of said roller 83 being thus transferred to the left ink ribbon roller on which the ribbon is then wound so that a new portion of said ribbon will always be put to use.

The adding machine represented on the drawings has only five wheels 5 but any number may be used of course.

The details and arrangements in the form of apparatus described may be modified or others operating in the same manner may be substituted without departing from the essential features of the invention as set forth in the claims. Thus, for instance, any known or desired device for transmitting the numbers to be carried over from one adding wheel to the next of higher value may be employed instead of the one shown, in which case the pivoted tooth 43 may be rigidly connected with the arm 41. The device shown, however, requires a less amount of force.

By applying to the machine a device permitting the release of both catches 30 and 31 from engagement with the wheel 27 the carriage may be set free and by means of the knob 35 the tooth 43 may be caused to engage any desired wheel of the adding wheels 5. An example of a similar device for releasing the carriage is shown in Figs. 24, 25 and 26 in a view from the end, from above and from the side respectively. The arm 32 is here divided in two parts $32^x$ and $32^{xx}$ each pivoted at 33 and each carrying one of the catches 31 and 30. Figs. 27–29 illustrate the form of the two arms $32^x$ and $32^{xx}$. 60 is an arm pivoted at 61 and provided with a projection 62. By moving the free end of the arm 60 in the direction indicated by the arrow in Fig. 25 the projection 62 pushes the arm $32^x$ so far that the catch 31 comes out of the way for the wheel 27. Thus both catches 30 and 31 are out of engagement with the wheel 27. The carriage 24 being thereafter by means of the knob 35 brought into the desired position, the arm 60 is returned to the initial position thereby allowing the arm $32^x$ to be brought back by the forked end of the arm 34 and the spring acting on said arm so as to cause again the catch 31 to engage the wheel 27.

In the construction given to the form of machine shown it is adapted for recording and printing the addenda from the left to the right but from the operation it is obvious that the machine may as well be disposed so as to record and print the addenda in the opposite direction. Further, according to the description, the wheel 1 with the coupling device for the adding wheels 5 have been arranged on a movable carriage moving relatively to the wheels 5 and to the paper on which the addenda are printed, but obviously the same result is obtained if instead the wheels 5 and the paper are made to move relatively to the coupling device and the wheel 1.

Instead of the arrangement described of inclined planes against which the spindles of the keys work said spindles may for instance, as shown diagrammatically in Figs. 30 and 31 for some keys, operate upon arms 71 extending from a shaft 71'. For obtaining different angles of rotation corresponding to the keys respectively the arms 70 may either, as shown in Fig. 30, be placed in different axial planes or else the arms may lie in the same plane but the spindles respectively work on different distances from the shaft or on arms of different lengths. The motions thus imparted to the shaft 71 are transferred by any suitable mechanism to the arm 41 with tooth 43.

I claim:—

1. An adding machine comprising a set of adding wheels with numerals on the peripheries and a shaft on which said adding wheels are loosely mounted, transmitting mechanisms between said adding wheels, which are spaced on the shaft, an operating wheel on the same shaft, a coupling device on said operating wheel and means for coupling and uncoupling it with each adding wheel successively, a key-board, means for transferring the movements of the keys to the operating wheel and means for returning the operating wheel to its initial position when the depressed key is released, substantially as and for the purpose set forth.

2. An adding machine comprising a set of adding wheels with type numerals on the peripheries and a shaft on which said adding wheels are loosely mounted, transmitting mechanism between said adding wheels, an operating wheel on the same shaft with type numerals on part of its periphery, a coupling device on said operating wheel and means for coupling and uncoupling it with each adding wheel successively, a key-board, means for transferring the movements of the keys to the operating wheel, means for returning the operating wheel to its initial position when the depressed key is released, paper band and ink ribbon in front of the type wheels, means for moving said band and ribbon, hammers and means for operating them, substantially as and for the purpose set forth.

3. An adding machine comprising a set of adding wheels with type numerals on the peripheries and a shaft on which said adding wheels are loosely mounted, transmitting mechanisms between said adding wheels, an operating wheel on the same shaft, with type numerals on part of its periphery, a coupling device on said operating wheel and means for coupling and uncoupling it with each adding wheel successively, a key-board, means for transferring the movements of the keys to the operating wheel, means for moving the operating wheel toward and from the set of adding wheels, means for returning the operating wheel to its initial position when the depressed key is released, paper band and ink ribbon in front of the type wheels, means for moving said band and ribbon, a hammer for the operating wheel, means for operating said hammer from the keys, a hammer for the set of adding wheels and a special key for operating said hammer, substantially as and for the purpose set forth.

4. An adding machine comprising adding wheels, an operating wheel with an arm, type-carrying wheels over which said arm extends, a pivoted tooth on said arm for engaging slots between the types on the periphery of said adding wheels, a carriage supporting the operating wheel, a rack on said carriage, a toothed wheel meshing with said rack, means for intermittingly rotating the toothed wheel for moving the carriage and the operating wheel relatively to the adding wheels, projections on the hub of the pivoted tooth, fixed stops at the opposite ends of the path of each projection, means for returning the operating wheel to its initial position when the pivoted tooth occupies the space between two adding wheels, and means for printing the numerals, substantially as and for the purpose set forth.

In testimony whereof I have signed my name to this specification, in the presence of two subscribing witnesses.

ALLAN WIBERG.

Witnesses:
 M. V. GEGARFELT HESLARÅS,
 HJALMAR BOUTARD WESTERÅS.